(12) United States Patent
Goodwin et al.

(10) Patent No.: US 10,627,020 B2
(45) Date of Patent: Apr. 21, 2020

(54) SYSTEM AND METHOD FOR A PIPE ASSEMBLY

(71) Applicant: FISHER CONTROLS INTERNATIONAL LLC, Marshalltown, IA (US)

(72) Inventors: Justin Paul Goodwin, Marshalltown, IA (US); Jason Gene Olberding, Marshalltown, IA (US); Tyler Thomas Stalcup, Marshalltown, IA (US)

(73) Assignee: FISHER CONTROLS INTERNATIONAL LLC, Marshalltown, IA (US)

( * ) Notice: Subject to any disclaimer, the term of this patent is extended or adjusted under 35 U.S.C. 154(b) by 539 days.

(21) Appl. No.: 14/594,521

(22) Filed: Jan. 12, 2015

(65) Prior Publication Data
US 2015/0198267 A1     Jul. 16, 2015

Related U.S. Application Data (60) Provisional application No. 61/928,302, filed on Jan. 16, 2014.

(51) Int. Cl.
| | | |
|---|---|---|
| *F16L 9/00* | (2006.01) | |
| *F16L 9/18* | (2006.01) | |
| *B23P 15/00* | (2006.01) | |
| *F01K 5/02* | (2006.01) | |

(52) U.S. Cl.
CPC .............. *F16L 9/18* (2013.01); *B23P 15/00* (2013.01); *F01K 5/02* (2013.01); *Y10T 29/49879* (2015.01)

(58) Field of Classification Search
CPC ......... F16L 9/18; F01K 5/02; Y10T 29/49879
USPC ................................ 138/112, 114, 109, 148
See application file for complete search history.

(56) References Cited

U.S. PATENT DOCUMENTS

| | | | | |
|---|---|---|---|---|
| 240,497 A | * | 4/1881 | Babcock | F16L 9/18 138/114 |
| 1,930,782 A | * | 10/1933 | Turner | F28G 1/16 122/392 |
| 2,207,522 A | * | 7/1940 | Smith | H01B 11/1873 138/114 |
| 2,949,852 A | * | 8/1960 | Schaefer | B41F 13/10 101/375 |
| 3,511,282 A | * | 5/1970 | Willhite | F16L 59/06 138/113 |

(Continued)

FOREIGN PATENT DOCUMENTS

| | | |
|---|---|---|
| CN | 1979081 A | 6/2007 |
| GB | 822705 A | 10/1959 |

OTHER PUBLICATIONS

"Fisher® DMA, DMA/AF, DMA/AF-HTC, DSA, DVI, and TBX-T Desuperheaters," Product Bulletin 85.2:DMA, Dec. 2011, 12 pages.

(Continued)

*Primary Examiner* — James F Hook
(74) *Attorney, Agent, or Firm* — Marshall, Gerstein & Borun LLP (57) ABSTRACT

An apparatus and method for configuring a pipe assembly includes an inner pipe positioned within an outer pipe, wherein at least one guide fixedly attached near an end of the pipe assembly cooperates with a recess integrated near the end of the pipe assembly to retain movement of the inner pipe with respect to the outer pipe.

17 Claims, 8 Drawing Sheets

(56) References Cited

U.S. PATENT DOCUMENTS

| | | | | |
|---|---|---|---|---|
| 3,637,239 A * | 1/1972 | Daniel | F16L 37/088 | 285/230 |
| 3,847,208 A * | 11/1974 | Ollendorf | B64G 1/506 | 138/113 |
| 3,928,903 A * | 12/1975 | Richardson | E21B 17/00 | 138/113 |
| 3,934,618 A * | 1/1976 | Henderson | F16L 9/18 | 138/114 |
| 3,943,618 A * | 3/1976 | Perkins | E21B 17/00 | 138/109 |
| 4,036,617 A * | 7/1977 | Leonard | F16L 7/00 | 138/112 |
| 4,790,290 A * | 12/1988 | Chevalier | B29C 44/1247 | 122/19.2 |
| 4,940,098 A * | 7/1990 | Moss | E21B 17/18 | 138/113 |
| 5,102,481 A * | 4/1992 | Sharp | B65D 90/24 | 156/172 |
| 5,125,691 A * | 6/1992 | Bogdan | E21B 17/18 | 138/113 |
| 5,624,140 A * | 4/1997 | Allen | B29C 65/20 | 138/114 |
| 6,978,807 B1 * | 12/2005 | Keyes | F16L 55/00 | 138/112 |
| 7,011,115 B1 * | 3/2006 | Giovannini | F16L 59/143 | 138/112 |
| 8,770,628 B2 * | 7/2014 | Alhaug | E21B 17/042 | 285/123.12 |
| 2001/0012476 A1 * | 8/2001 | Louis | F16L 1/123 | 405/168.2 |
| 2005/0011573 A1 * | 1/2005 | Chahine | F01N 13/1816 | 138/148 |
| 2005/0212285 A1 * | 9/2005 | Haun | F16L 9/18 | 285/123.1 |
| 2007/0107793 A1 * | 5/2007 | Uehara | B05B 1/302 | 138/112 |

OTHER PUBLICATIONS

Office Action in Chinese Patent Application No. 201510024447.7, dated Mar. 13, 2019.

* cited by examiner

SYSTEM AND METHOD FOR A PIPE ASSEMBLY

RELATED APPLICATIONS

This application claims benefit to the filing date of U.S. Provisional Patent Application 61/928,302, filed Jan. 16, 2014; the contents of which are expressly incorporated herein.

FIELD OF THE DISCLOSURE

The present disclosure is directed to pipes and, more particularly, to a pipe assembly having a robust design for use in a variety of fluid system operations.

BACKGROUND

Process control systems, such as distributed or scalable process control systems like those used in chemical, petroleum, power, pulp and paper, or other processes, may include one or more pipes to facilitate movement of a fluid throughout the process plant. In some applications, steam or another fluid may be transported through the process plant and superheated and cooled at prescribed locations within the system. For example, an attemperator or desuperheater may be utilized to cool the steam within a steam pipe assembly between superheating stages in a boiler or in a heat recovery steam generator. The steam pipe assembly may include a liner pipe disposed within a main pressure boundary pipe to protect the boundary pipe from the cooling liquid that is sprayed into the steam pipe assembly to cool the steam. The liner pipe decreases the likelihood of the boundary pipe cracking due to the thermal shock or thermal quenching that may occur during the injection of the cooler liquid into the flow of steam.

Many pipe assembly configurations that include a liner pipe within a boundary pipe or an outer pipe involve the use of alignment rods positioned between the outside of the liner piper and the inside of the boundary pipe. The alignment rods may be welded to the outside of the liner pipe and generally prevent the liner pipe from vibrating within the boundary pipe. When the shape of the liner pipe and/or the boundary pipe is irregular or not compatible for fitting together, it can be difficult to place the liner pipe with the attached alignment rods within the boundary pipe. To accommodate the placement of the liner pipe within the steam pipe assembly, it is common to machine-bore the entire interior of the boundary pipe and/or machine down portions of the alignment rods.

SUMMARY

One aspect of the present disclosure is directed to a pipe assembly having a first end and a second end. The pipe assembly includes an outer pipe including an outer pipe interior surface and an outer pipe exterior surface. The outer pipe interior surface extends between a first end and a second end of the outer pipe and includes an outer pipe interior diameter. The outer pipe exterior surface extends between the first end and the second end of the outer pipe and includes an outer pipe exterior diameter. The pipe assembly further includes an inner pipe positioned within the outer pipe, wherein the inner piper includes an inner pipe interior surface and an inner pipe exterior surface. The inner pipe interior surface extends between a first end and a second end of the inner pipe and includes an inner pipe interior diameter. The inner pipe exterior surface extends between the first end and the second end of the inner pipe and includes an inner pipe exterior diameter. The pipe assembly further includes a guide and a recess assembly wherein the recess is defined within the pipe assembly proximate the first end of the pipe assembly and sized to receive at least a portion of the guide fixedly attached to the pipe assembly, such that the guide and recess cooperate to prevent movement of the inner pipe in a first direction with respect to the outer pipe.

Another aspect of the present disclosure is directed to a pipe assembly having a first end and a second end. The pipe assembly further includes an outer pipe having a first end and a second end, and an inner pipe having a first end and a second end, wherein the inner pipe is positioned within the outer pipe. The pipe assembly also includes a guide fixedly attached to the pipe assembly proximate the first end of the outer pipe and the first end of the inner pipe, and a recess sized to receive at least a portion of the guide and located proximate the first end of the outer pipe and the first end of the inner pipe, wherein the guide and the recess cooperate to prevent movement of the inner pipe within the outer pipe in a first direction.

A further aspect of the present disclosure is directed to a method for configuring a pipe assembly. The method provides an inner pipe and an outer pipe, creates a recess within an inner surface of the outer pipe and sized to receive at least a portion of a guide, attaches the guide to an outer surface of the inner pipe, and inserts the inner pipe within the outer pipe, wherein the recess and the guide cooperate to prevent the inner pipe from movement in a first direction within the outer pipe.

A still further aspect of the present disclosure is directed to a pipe assembly having a first end and a second end. The pipe assembly includes an outer pipe including an outer pipe interior surface and an outer pipe exterior surface. The outer pipe interior surface extends between a first end and a second end of the outer pipe and includes an outer pipe interior diameter. The outer pipe exterior surface extends between the first end and the second end of the outer pipe and includes an outer pipe exterior diameter. The pipe assembly further includes an inner pipe positioned within the outer pipe, wherein the inner piper includes an inner pipe interior surface and an inner pipe exterior surface. The inner pipe interior surface extends between a first end and a second end of the inner pipe and includes an inner pipe interior diameter. The inner pipe exterior surface extends between the first end and the second end of the inner pipe and includes an inner pipe exterior diameter. The pipe assembly further includes a guide and a recess assembly wherein the guide and the recess are each defined within the pipe assembly proximate the first end of the pipe assembly and sized to operatively cooperate such that the guide and recess prevent movement of the inner pipe in a first direction with respect to the outer pipe.

In further accordance with the inventive aspects described herein, any one or more of the foregoing embodiments may further include any one or more of the following forms.

In one form, the pipe assembly includes the guide fixedly attached to the inner pipe exterior surface and the recess includes a recess diameter extending from the outer pipe interior surface, wherein the recess diameter is larger than the outer pipe interior diameter.

In another form of the pipe assembly, the recess includes a vertical or radial portion and an axial or horizontal portion, wherein the radial portion extends abruptly from the outer pipe interior surface and the axial portion extends abruptly from the radial portion.

In another form of the pipe assembly, the recess includes a sloped or inclined portion that gradually extends from the outer pipe interior surface.

In another form of the pipe assembly, the guide is a continuous ring or one or more individual discrete arcuate portions thereof, such as a belt, strap, ribbon, strip, band and the like.

In another form of the pipe assembly, the guide is welded, press-fit, bolted, and the like, to the inner pipe exterior surface.

In another form of the pipe assembly, the pipe assembly includes a pin fixedly attached to the outer pipe exterior surface, wherein the pin projects through the outer pipe exterior surface, the outer pipe interior surface, and the inner pipe exterior surface. The pin may be welded, press-fit, bolted, and the like, to the pipe assembly.

In another form of the pipe assembly, the guide is fixedly attached to the outer pipe interior surface and the recess includes a recess diameter extending from the inner pipe exterior surface, wherein the recess diameter is smaller than the inner pipe exterior diameter.

In another form of the pipe assembly, the recess includes a vertical or radial portion and an axial or horizontal portion, wherein the radial portion extends abruptly from the inner pipe exterior surface and the axial portion extends abruptly from the radial portion.

In another form of the pipe assembly, the recess includes a sloped or inclined portion that gradually extends from the inner pipe exterior surface.

In another form of the pipe assembly, the pipe assembly includes a second guide fixedly attached to the pipe assembly proximate the second end of the pipe assembly, and a second recess defined within the pipe assembly proximate the second end of the pipe assembly and sized to receive at least a portion of the second guide, wherein the second guide cooperates with the second recess to prevent movement of the inner pipe in a second direction with respect to the outer pipe.

In another form of the pipe assembly, the second guide is fixedly attached to the inner pipe exterior surface and the second recess includes a second recess diameter extending from the outer pipe interior surface, wherein the second recess diameter is larger than the outer pipe interior diameter.

In another form of the pipe assembly, the second recess includes a vertical or radial portion and an axial or horizontal portion, wherein the radial portion extends abruptly from the outer pipe interior surface and the axial portion extends abruptly from the radial portion.

In another form of the pipe assembly, the second recess includes a sloped or inclined portion that gradually extends from the outer pipe interior surface.

In another form of the pipe assembly, the second guide is a continuous ring or one or more individual discrete arcuate portions thereof, such as a belt, strap, ribbon, strip, and the like.

In another form of the pipe assembly, the second guide is fixedly attached to the inner pipe exterior surface by a weld, press-fit, bolt, and the like.

In another form of the pipe assembly, the second guide is fixedly attached to the outer pipe interior surface and the second recess includes a second recess diameter extending from the inner pipe exterior surface, wherein the second recess diameter is smaller than the inner pipe exterior diameter.

In another form of the pipe assembly, the second recess includes a vertical or radial portion and an axial or horizontal portion, wherein the radial portion extends abruptly from the inner pipe exterior surface and the axial portion extends abruptly from the radial portion.

In another form of the pipe assembly, the second recess includes a sloped or inclined portion that gradually extends from the inner pipe exterior surface.

In another form of the pipe assembly, the second guide is attached by a weld, press-fit, bolt, and the like, to the outer pipe interior surface.

In another form of the method, the method includes creating a second recess within the inner diameter of the outer pipe, and attaching a second guide to the outer diameter of the inner pipe, wherein the second recess and second guide cooperate to prevent the inner pipe from movement in a second direction within the outer pipe.

DETAILED DESCRIPTION

The present invention is directed to the design and configuration of a robust pipe assembly for transporting a fluid. The pipe assembly includes an inner pipe set within an outer pipe, wherein the inner pipe may be comprised of material that is less susceptible to the properties of the transported fluid as compared to the outer pipe. Such pipe assemblies may be incorporated in systems used to transport fluids that are adverse to the outer pipe or where the fluid is acted upon within the pipe assembly in such a manner that the action itself may adversely affect the outer pipe.

Figure 1A:
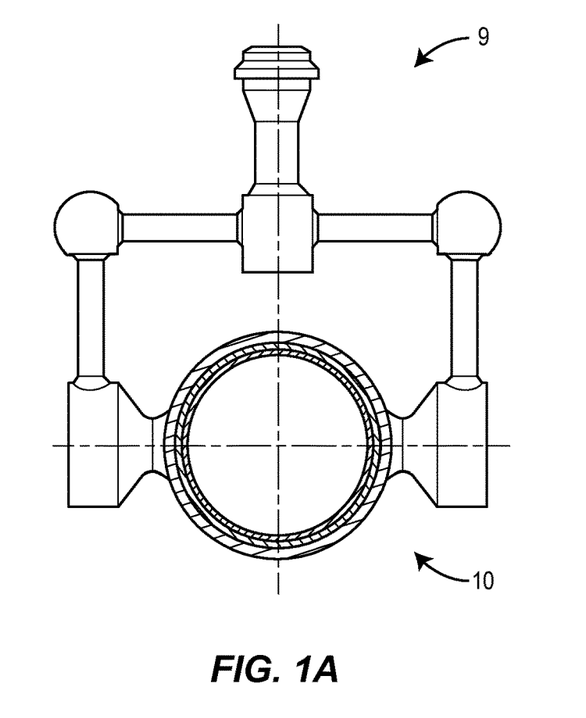
FIG. 1A is a schematic representation of a front view depicting an example pipe assembly constructed in accordance with the principles of the present disclosure operatively attached to an attemperator desuperheater.
Figure 1B:
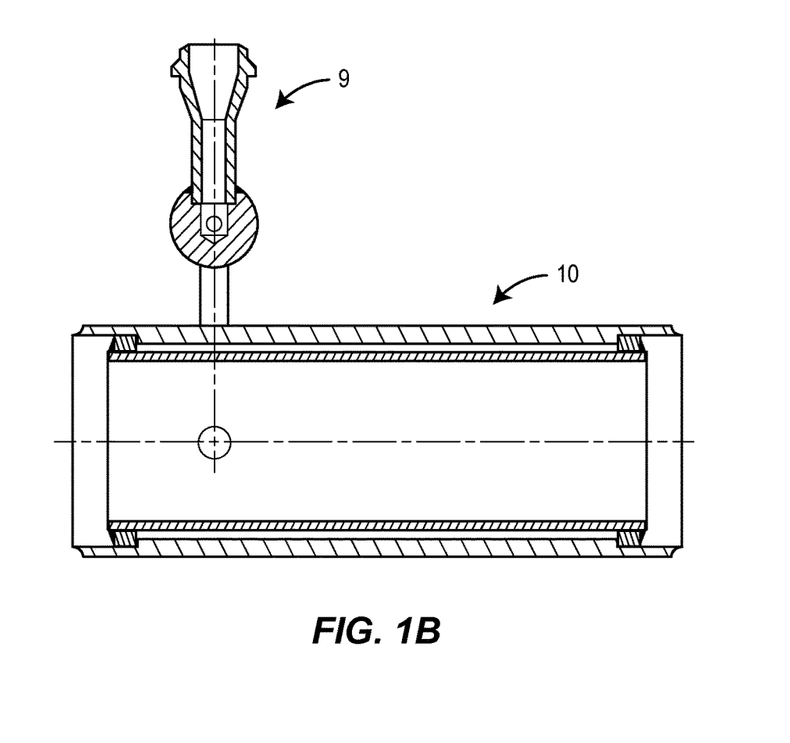
FIG. 1B is a schematic cross-sectional representation of a side view depicting the example pipe assembly and attemperator desuperheater shown in FIG. 1A.

Referring now to FIGS. 1A and 1B, a pipe assembly 10 constructed in accordance with one embodiment of the present disclosure is depicted as operatively connected to an attemperator or desuperheater 9 used to cool a fluid such as steam flowing within the pipe assembly 10. As the steam travels within the pipe assembly 10, a cooling liquid is injected from the desuperheater 9 into the pipe assembly 10 to cool the steam. It is to be understood that the pipe assembly 10 is capable of being used with various types of desuperheaters, for example, vertical or horizontal type mounting.

Figure 2A:
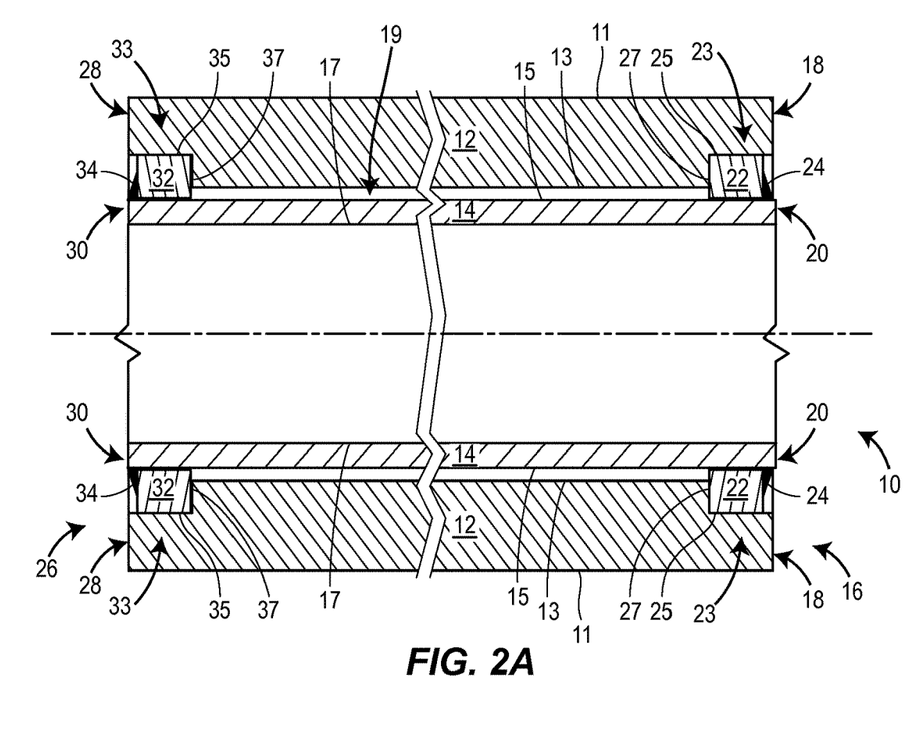
FIG. 2A is a partial cross-sectional schematic representation of a side view of one example pipe assembly constructed in accordance with the principles of the present disclosure.

FIG. 2A is an enlarged cross-section side view of the pipe assembly 10 shown in FIGS. 1A and 1B and having a first end 16 and a second end 26. The pipe assembly 10 includes a boundary pipe 12, which may also be referred to as a steam pipe or an outer pipe. The outer pipe 12 includes a first end 18 and a second end 28 wherein the first end 18 of the outer pipe 12 is proximate the first end 16 of the pipe assembly 10, and the second end 28 of the outer pipe 12 is proximate the second end 26 of the pipe assembly 10. A liner pipe 14, which may also be referred to as an inner pipe, includes a first end 20 and a second end 30 and is positioned within the outer pipe 12. The first end 20 of the inner pipe 14 is proximate the first end 18 of the outer pipe 12 and the first end 16 of the pipe assembly 10, and the second end 30 of the inner pipe 14 is proximate the second end 28 of the outer pipe 12 and the second end 26 of the pipe assembly 10.

Figure 2B:
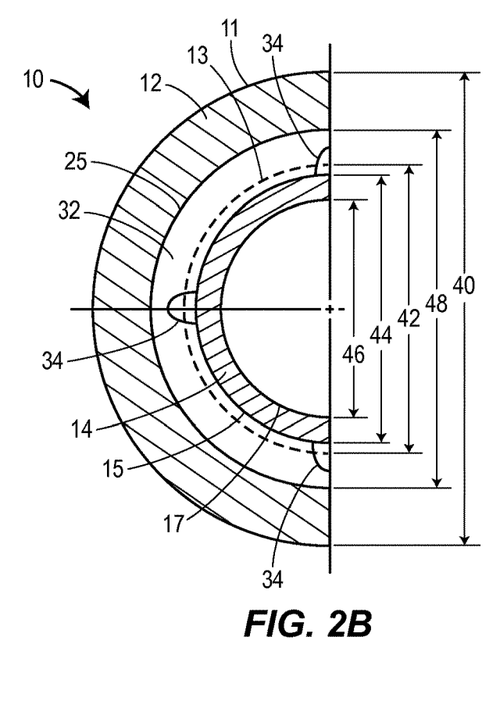
FIG. 2B is a partial cross-sectional schematic representation of a front view of the pipe assembly shown in FIG. 2A.

Upon further observation of the example embodiment of the pipe assembly 10 shown in FIG. 2A and FIG. 2B, the outer pipe 12 includes an outer pipe exterior surface 11 and an outer pipe interior surface 13. The outer pipe exterior surface 11 extends about the exterior cylinder of the outer pipe 12 between the first end 18 and the second end 28 of the outer pipe 12 and includes an outer pipe exterior diameter 40 shown in the partial front view of the pipe assembly 10 illustrated in FIG. 2B. The outer pipe interior surface 13 extends about the interior cylinder of the outer pipe 12 between the first end 18 and the second end 28 of the outer pipe 12 and includes an outer pipe interior diameter 42 shown in the partial front view of the pipe assembly 10 illustrated in FIG. 2B.

Similar to the outer pipe 12, the inner pipe 14 that is positioned within the outer pipe 12 includes an inner pipe exterior surface 15 and an inner pipe interior surface 17. The inner pipe exterior surface 15 extends about the exterior cylinder of the inner pipe 14 between the first end 20 and the second end 30 of the inner pipe 14 and includes an inner pipe exterior diameter 44 shown in the partial front view of the pipe assembly 10 illustrated in FIG. 2B. The inner pipe interior surface 17 extends about the interior cylinder of the inner pipe 14 between the first end 20 and the second end 30 of the inner pipe 14 and includes an inner pipe interior diameter 46 shown in the partial front view of the pipe assembly 10 illustrated in FIG. 2B.

To prevent movement of the inner pipe 14 with respect to the outer pipe 12 in one or more directions, the pipe assembly 10 may include a guide and recess assembly. When configured in the pipe assembly 10, a guide cooperates with a recess to retain the inner pipe 14 from moving axially (laterally or horizontally in FIG. 2A) and/or radially (vertically in FIG. 2A) within the outer pipe 12. In the example pipe assembly embodiment 10 shown in FIGS. 2A and 2B, a guide 22 is fixedly attached to the inner pipe exterior surface 15. It is to be understood that the term "fixedly attached" in the instance of the guide being attached to any portion of the pipe assembly denotes that the guide is attached to the pipe assembly in a manner that allows the guide to remain attached to the pipe assembly during normal use. Therefore, the attachment of the guide 22 to the pipe assembly 10 does not need to be permanent and the ability to remove or detach the guide 22 from the pipe assembly 10 is not inconsistent with the ability of the guide 22 to be fixedly attached to the pipe assembly 10 during normal use. The guide 22 may be fixedly attached to the pipe assembly 10, for example, the inner 14 or outer pipe 12, in any one or a combination of manners including, and not limited to, screw(s), thread(s), weld(s), press-fit(s), and bolt(s). In embodiments where a weld is utilized, the weld may be a continuous fillet weld proximate the guide and the pipe assembly or one or more individual welds, e.g., spot welds, may be spaced about one or both of the ends of the pipe assembly and proximate the guide(s).

In FIGS. 2A and 2B, the guide 22 is fixedly attached to the inner pipe 14 by a weld attachment 24, for example, proximate the first end 16 of the pipe assembly 10. The guide 22 cooperates with a recess 23 defined within the pipe assembly 10 proximate the first end 16 of the pipe assembly 10 to prevent movement of the inner pipe 14 in a first direction with respect to the outer pipe 12. In particular, the recess 23 is sized to receive at least a portion of the guide 22 and extends from the outer pipe interior surface 13 and includes an axially extending horizontal portion 25 and a radially extending vertical portion 27. The axial or horizontal portion 25 of the recess 23 defines a recess diameter 48 within the outer pipe 12. The guide 22 and the recess 23 cooperate to preclude the inner pipe 14 that is fixedly attached to the guide 22 from moving axially toward the left side of FIG. 2A with respect to the outer pipe 12 when the guide 22 abuts the radial portion 27 of the recess 23. In addition, the inner pipe 14 is deterred from moving radially toward and/or away from the outer pipe 12 when the guide 22 abuts the axial portion 25 of the recess 23.

Various embodiments of the guide may include, and are not limited to, a continuous circular band such as a ring, hoop, round, and the like, as well as one or more individual discrete arcuate items, such as a belt, strap, ribbon, strip, and the like. The recess defined within the pipe assembly 10 is sized to receive at least a portion of guide. The guide, recess, and the weld may cooperate to preclude fluid transported within the inner pipe from entering a channel 19 defined between the inner 14 and outer 12 pipes, that is, between the inner pipe exterior surface 15 and the outer pipe interior surface 13. Preventing fluid from being transported within the channel 19 defined between the inner 14 and outer 12 pipes may ensure that all of the transported fluid is properly delivered within the process system and/or acted upon within the inner pipe, for example, in a desuperheater application.

To prevent movement of the inner pipe 14 with respect to the outer pipe 12 in a second direction opposite to the first direction, the pipe assembly 10 may include an additional cooperating guide and recess assembly configured proximate the end of the pipe assembly opposite the end that includes the guide 22 and the recess 23; which may now be referred to as the first guide 22 and the first recess 23, respectively. When configured in the pipe assembly 10, a second guide 32 cooperates with a second recess 33, which is sized to receive at least a portion of the second guide 32, to preclude the inner pipe 14 from moving axially and/or radially within the outer pipe 14. In particular, the second guide 32 is fixedly attached to the inner pipe 14 proximate the second end 26 of the pipe assembly 10, wherein the second guide 32 may cooperate with the second recess 33 to prevent the inner pipe 14 from moving axially or horizontally with respect to the outer pipe 12 in a second direction toward the first end 16 of the pipe assembly 10 of FIG. 2A. More specifically, the second recess 33 includes an axial or horizontal portion 35 and a radial or vertical portion 37, both of which are defined within and ultimately extend from the outer pipe interior surface 13. Axial or lateral movement of the inner pipe toward the right side of FIG. 2A with respect to the outer pipe 12 is prevented when the second guide 32, which is fixedly attached to the inner pipe 14, abuts the radial or vertical portion 37 of the second recess 33. In addition, the inner pipe 14 is deterred from moving radially toward and/or away from the outer pipe 12 when the second guide 32 abuts the axial or horizontal portion 35 of the second recess 33.

Figure 3A:
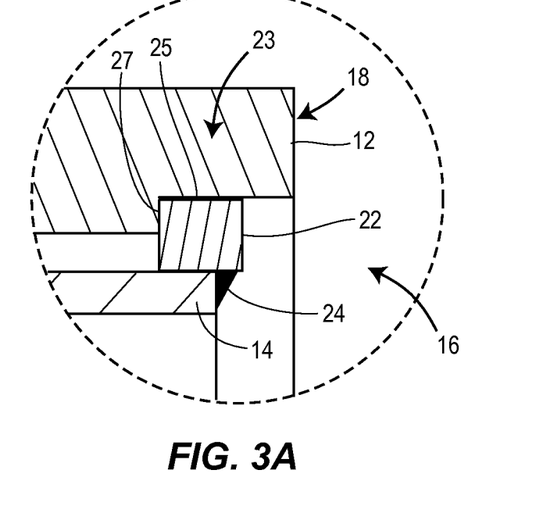
FIG. 3A is a partial cross-sectional schematic representation of an alternate means of attachment for the second guide to the inner pipe in accordance with the principles of the present disclosure and as shown in a similar perspective illustrated in the upper right corner of FIG. 2A.
Figure 3B:
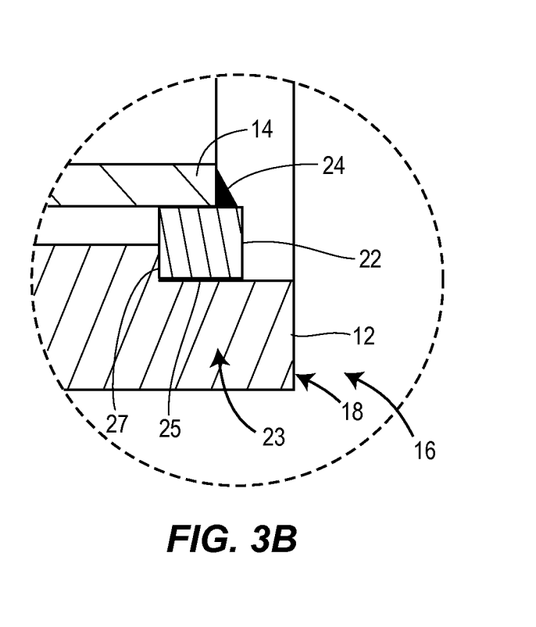
FIG. 3B is a partial cross-sectional schematic representation of an alternate means of attachment for the second guide to the inner pipe in accordance with the principles of the present disclosure and as shown in a similar perspective illustrated in the lower right corner of FIG. 2A.

FIGS. 3A and 3B illustrate an alternate attachment means that may be utilized in the pipe assembly to fixedly attach the guide(s) to the inner pipe 14 shown in FIGS. 2A and 2B. FIG. 3A is a close-up view of the first end 16 of the pipe assembly 10, in particular, the upper right portion of the pipe assembly 10 as illustrated in FIG. 2A, wherein a weld 24 fixedly attaching the first guide 22 to the inner pipe 14 is located more towards the axis or interior of the pipe assembly 10 with respect to the corresponding weld 24 shown in the upper right portion of FIG. 2A. Similarly, FIG. 3B is a close-up view of the first end 16 of the pipe assembly 10, in particular, the lower right portion of the pipe assembly as illustrated in FIG. 2A, wherein the weld 24 fixedly attaching the first guide 22 to the inner pipe 14 is located more towards the axis or interior of the pipe assembly 10 with respect to the corresponding weld 24 shown in the lower right portion of FIG. 2A.

Figure 4A:
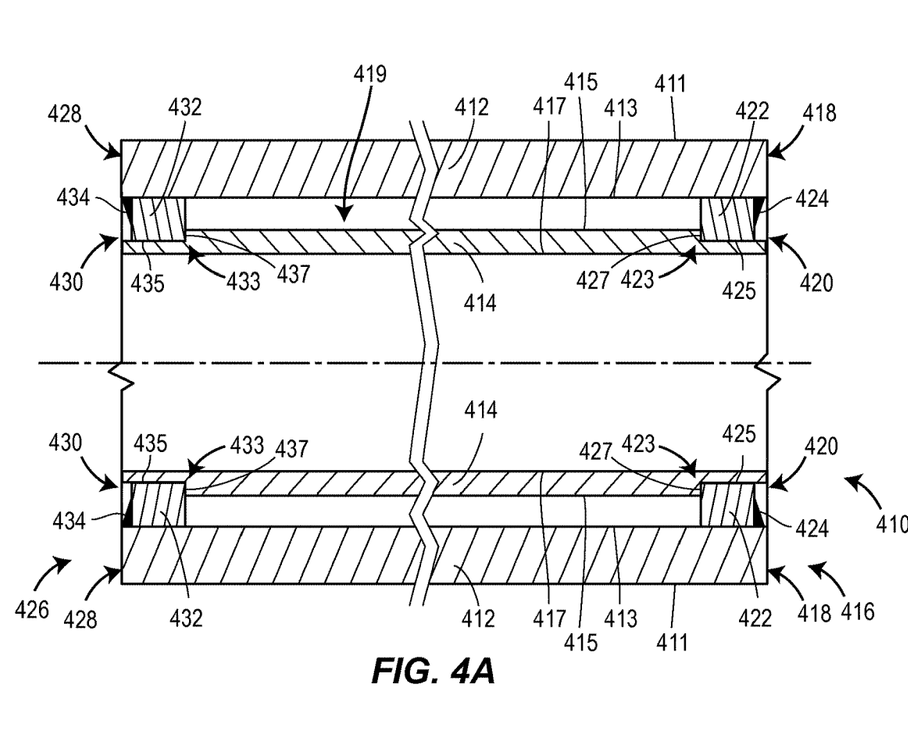
FIG. 4A is a partial cross-sectional schematic representation of a side view of another example pipe assembly constructed in accordance with the principles of the present disclosure.
Figure 4B:
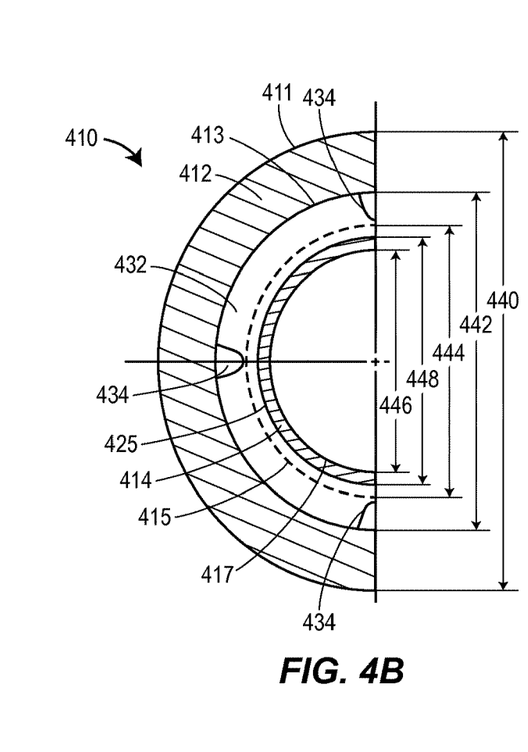
FIG. 4B is a partial cross-sectional schematic representation of a front view of the pipe assembly shown in FIG. 4A.

FIGS. 4A and 4B illustrate another embodiment of the pipe assembly, wherein the guide and recess assembly are configured in the pipe assembly by an alternate means. The pipe assembly 410 includes a first end 416 and a second end 426 as well as an outer pipe 412. The outer pipe 412 includes a first end 418 and a second end 428 wherein the first end 418 of the outer pipe 412 is proximate the first end 416 of the pipe assembly 410, and the second end 428 of the outer pipe 412 is proximate the second end 426 of the pipe assembly 410. An inner pipe 414, which is positioned within the outer pipe 412, includes a first end 420 and a second end 430. The first end 420 of the inner pipe 414 is proximate the first end 428 of the outer pipe 412 and the first end 416 of the pipe assembly 410, and the second end 430 of the inner pipe 414 is proximate the second end 428 of the outer pipe 412 and the second end 426 of the pipe assembly 410.

The outer pipe 412 includes an outer pipe exterior surface 411 and an outer pipe interior surface 413. The outer pipe exterior surface 411 extends about the exterior cylinder of the outer pipe 412 between the first end 418 and the second end 428 of the outer pipe 412 and includes an outer pipe exterior diameter 440 shown in the front view of the pipe assembly 410 illustrated in FIG. 4B. The outer pipe interior surface 413 extends about the interior cylinder of the outer pipe 412 between the first end 418 and the second end 428 of the outer pipe 412 and includes an outer pipe interior diameter 442 shown in the front view of the pipe assembly 410 illustrated in FIG. 4B.

Similar to the outer pipe 412, the inner pipe 414 that is positioned within the outer pipe 412 includes an inner pipe exterior surface 415 and an inner pipe interior surface 417. The inner pipe exterior surface 415 extends about the exterior cylinder of the inner pipe 414 between the first end 420 and the second end 430 of the inner pipe 414 and includes an inner pipe exterior diameter 444 shown in the front view of the pipe assembly 410 illustrated in FIG. 4B. The inner pipe interior surface 417 extends about the interior cylinder of the inner pipe 414 between the first end 420 and the second end 430 of the inner pipe 14 and includes an inner pipe interior diameter 446 shown in the front view of the pipe assembly 410 illustrated in FIG. 4B.

To prevent movement of the inner pipe 414 with respect to the outer pipe 412 in one or more directions, the pipe assembly 410 may include a guide and recess assembly. When configured in the pipe assembly 410, a guide cooperates with a recess to retain the inner pipe 414 from moving axially and/or radially within the outer pipe 412. In the pipe assembly 410 embodiment shown in FIGS. 4A and 4B, a guide 422 is fixedly attached to the outer pipe interior surface 413 by a weld attachment 424, for example, proximate the first end 416 of the pipe assembly 410. The guide 422 cooperates with a recess 423 defined within the pipe assembly 410 proximate the first end 416 of the pipe assembly 410 to prevent movement of the inner pipe 414 in a first direction with respect to the outer pipe 412. In particular, the recess 423 abruptly extends from the inner pipe exterior surface 415 into a radial or vertical portion 427 and an axial or horizontal portion 425. The axial or horizontal portion 425 of the recess 423 defines a recess diameter 448 within the inner pipe 414. The guide 422 and the recess 423 cooperate to preclude the inner pipe 414 from moving laterally or horizontally toward the right side of FIG. 4A with respect to the outer pipe 412 when the guide 422 abuts the radial portion 427 of the recess 423. In addition, the inner pipe 414 is deterred from moving radially toward and/or away from the outer pipe 412 when the guide 422 abuts the horizontal portion 425 of the recess 423. The guide 422, recess 423, and the weld 424 may cooperate to preclude fluid transported within the inner pipe from entering a channel 419 defined between the inner 414 and outer 412 pipes, that is, between the inner pipe exterior surface 415 and the outer pipe interior surface 413.

To prevent movement of the inner pipe 414 with respect to the outer pipe 412 in a second direction opposite the first direction, the pipe assembly 410 may include an additional cooperating guide and recess assembly configured proximate the end opposite the end of the pipe assembly that includes the guide 422; which may now be referred to as the first guide 422, and the recess 423 may now be referred to as the first recess 423. When configured in the pipe assembly 410, a second guide 432 cooperates with a second recess 433 to preclude the inner pipe 414 from moving axially and/or radially within the outer pipe 412. In particular, the second recess 433 includes an axial or horizontal portion 435 and a radial or vertical portion 437, both of which are defined within and ultimately extend from the inner pipe exterior surface 415. The second guide 432 and the second recess 433 cooperate to preclude the inner pipe 414 from moving axially or laterally toward the left side of FIG. 4A with respect to the outer pipe 412 when the radial portion 437 of the second recess 433 abuts the second guide 432. In addition, the inner pipe 414 is deterred from moving radially toward and/or away from the outer pipe 412 when the horizontal portion 435 of the second recess 433 abuts the second guide 432

Figure 5:
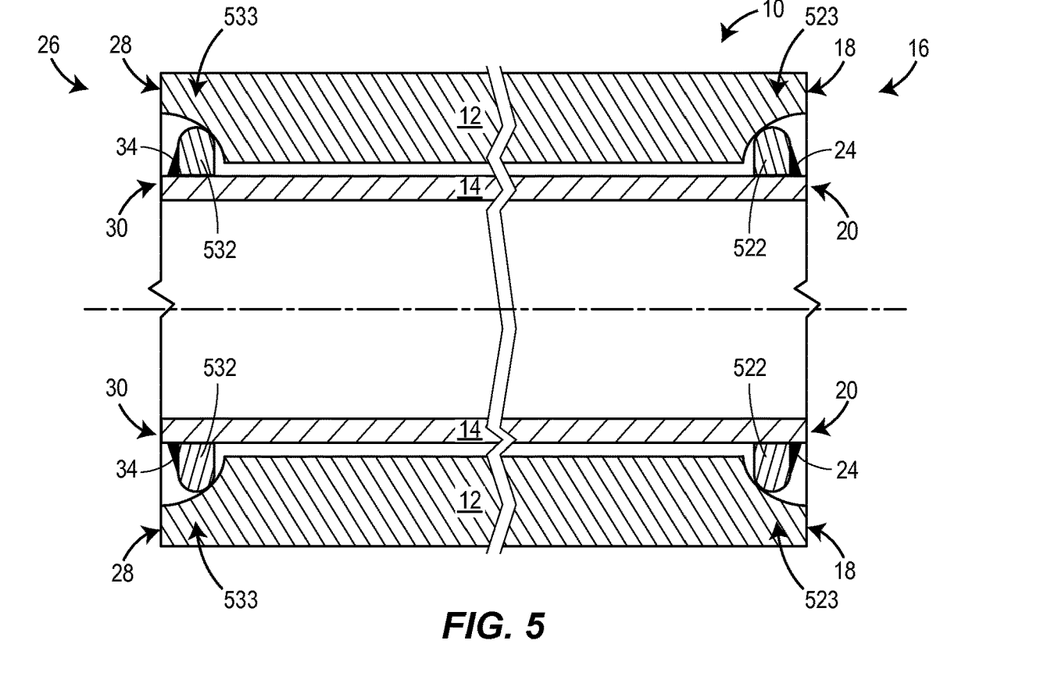
FIG. 5 is a partial cross-sectional schematic representation of a side view of the example pipe assembly shown in FIG. 2A with an alternate embodiment of the guide and recess constructed in accordance with the principles of the present disclosure.

Alternate embodiments of the cooperating guide and recess assembly capable of being integrated within the pipe assembly to preclude movement of the inner pipe with respect to the outer pipe are shown in FIGS. 5-8. In FIG. 5, the guide(s) 522, 532 and the recess(es) 523, 533 include cooperating arcuate portions that may include a gradual slope, incline, or taper. In comparison to the recess(es) 23, 33 employed in the pipe assembly illustrated in FIGS. 2A and 4A, wherein each recess abruptly extends initially radially or perpendicularly from the outer pipe interior surface 13 and then axially or horizontally therefrom, the recesses 523, 533 integrated into the pipe assembly 10 shown in FIG. 5 extend gradually in a slope or incline from the outer pipe interior surface.

Figure 6:
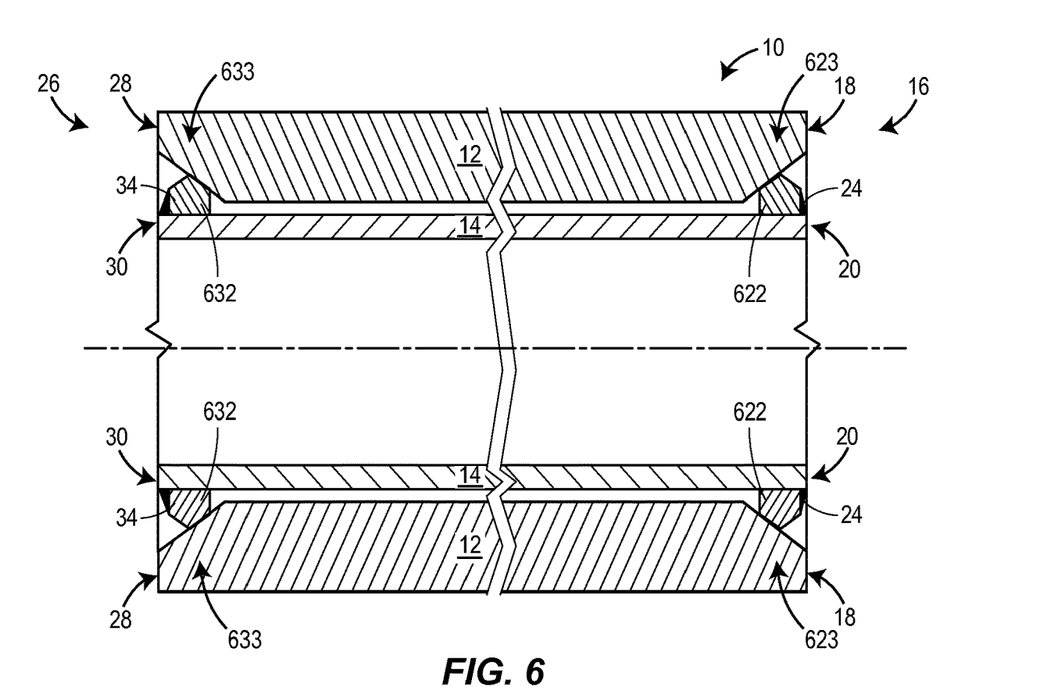
FIG. 6 is a partial cross-sectional schematic representation of a side view of the example pipe assembly shown in FIG. 2A with another alternate embodiment of the guide and recess constructed in accordance with the principles of the present disclosure.

The guides 622, 632 and the recesses 623, 633 shown in FIG. 6 include cooperating linear portions that are inclined. Similar to the recess(es) shown in FIG. 5, each recess 623, 633 includes a sloping surface that extends from the outer pipe interior surface. It is to be understood that in each of the configurations shown in FIGS. 5 and 6, the guides 522, 532, 622, 632 may be fixedly attached to the outer pipe and the recesses 523, 533, 623, 633 may be defined within and extend from the inner pipe exterior surface, similar to the guide and recess assemblies of the pipe assembly 410 illustrated in FIG. 4A.

Figure 7:
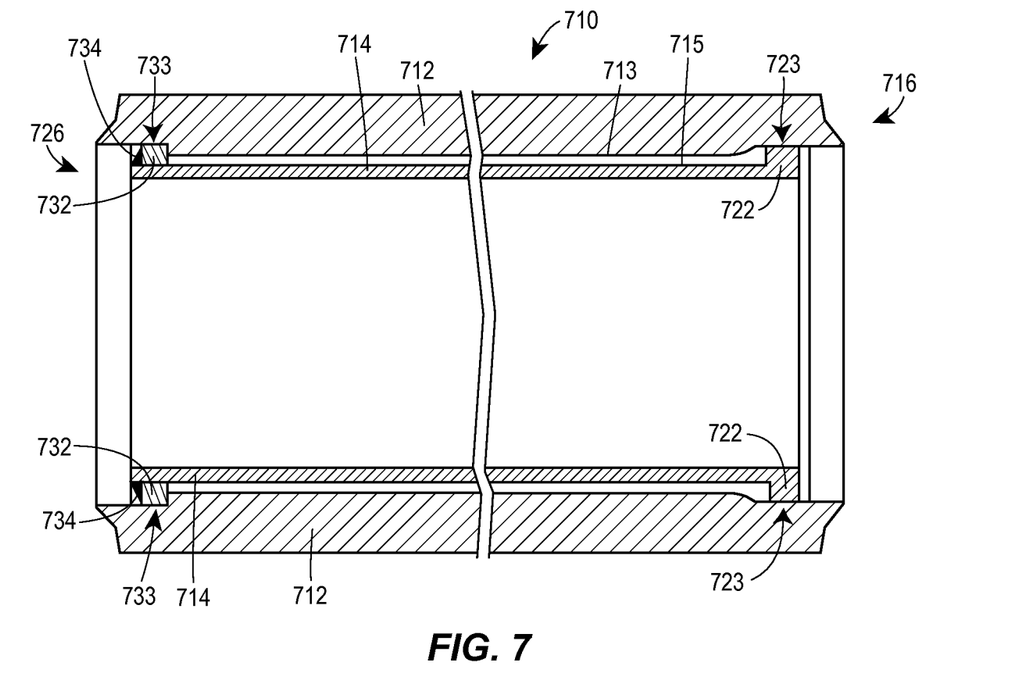
FIG. 7 is a partial cross-sectional schematic representation of a side view of the example pipe assembly shown in FIG. 2A including an alternate embodiment of the guide and recess assembly constructed in accordance with the principles of the present disclosure.
Figure 8:
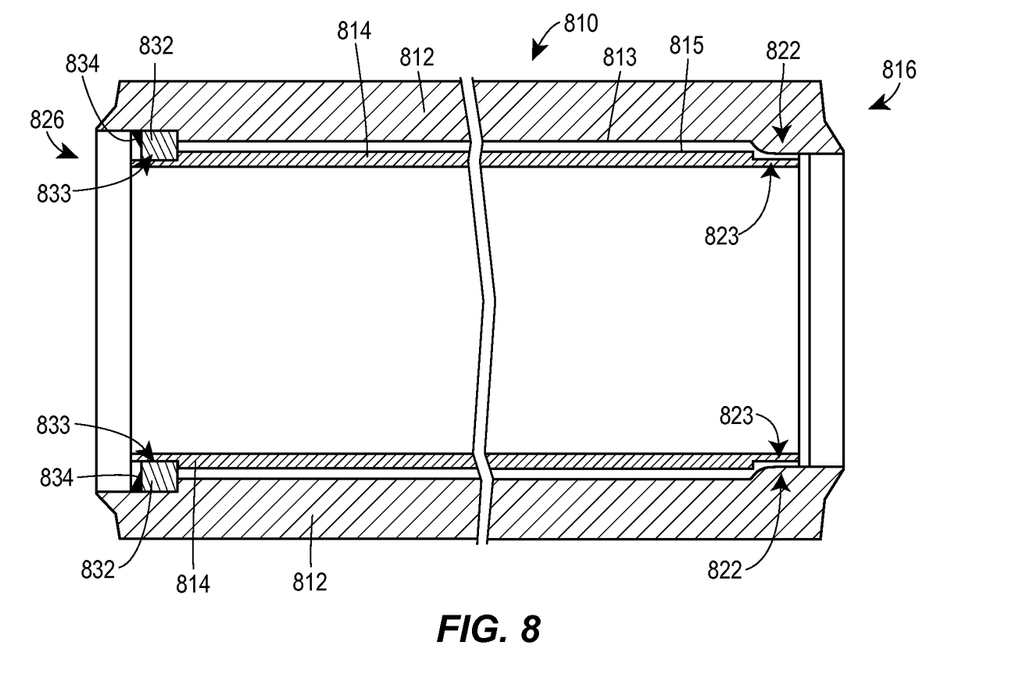
FIG. 8 is a partial cross-sectional schematic representation of a side view of the example pipe assembly shown in FIG. 4A including another alternate embodiment of the guide and recess assembly constructed in accordance with the principles of the present disclosure.

FIGS. 7 and 8 depict embodiments of the pipe assembly 710 wherein the guide is integrally defined within the inner or outer pipe. In FIG. 7, a guide 722 is integrally defined within and extends from the inner pipe exterior surface 715. The inner pipe exterior surface 715 may be machined to create the guide 722, which is formed to fit with the cooperating recess 723 integrally defined and extending from the outer pipe interior surface 713. The guide 722 cooperates with the recess 723 proximate the first end 716 of the pipe assembly 710 to prevent movement of the inner pipe 714 in a first direction with respect to the outer pipe 712. In particular, the recess 723 is sized to receive at least a portion of the guide 722 and extends from the outer pipe interior surface 713 and includes a radially extending portion that will interfere with the guide 722. The guide 722 and the recess 723 cooperate to preclude the inner pipe 714 from moving axially in the first direction toward the left side of FIG. 7 with respect to the outer pipe 712 when the guide 722 abuts the recess 723. In addition, the inner pipe 714 is deterred from moving radially toward and/or away from the outer pipe 712 when the guide 722 abuts the recess 723. If a second guide and recess assembly is utilized at the opposite end 726 of the pipe assembly 710, the second end 726 of the pipe assembly 710 may include a recess 733 and a guide 732 fixedly attached via weld 734 to the inner pipe 714 similar to that described and shown in FIG. 2A, which will preclude movement of the inner pipe 714 in a second direction, opposite the first direction, with respect to the outer pipe 712.

In FIG. 8, a guide 822 is integrally defined within and extends from the outer pipe interior surface 813. The outer pipe interior surface 813 may be machined to create the guide 822, which is formed to fit with the cooperating recess 823 integrally defined within and extending from the inner pipe exterior surface 815. The guide 822 cooperates with the recess 823 defined within the pipe assembly 810 proximate the first end 816 of the pipe assembly 810 to prevent movement of the inner pipe 814 in a first direction with respect to the outer pipe 812. In particular, the recess 823 extends from the inner pipe exterior surface 815 and is sized to receive at least a portion of the guide 822 that extends from the outer pipe interior surface 813, wherein the guide 822 includes a radially extending portion that will interfere with the recess 823. The guide 822 and the recess 823 cooperate to preclude the inner pipe 814 from moving in a first direction axially toward the right side of FIG. 8 with respect to the outer pipe 812 when the guide 822 abuts the recess 823. In addition, the inner pipe 814 is deterred from moving radially toward and/or away from the outer pipe 812 when the guide 822 abuts the recess 823. If a second guide and recess assembly is utilized at the opposite end 826 of the pipe assembly 810, the second end 826 of the pipe assembly 810 may include a recess 833 and a guide 832 fixedly attached via a weld 834 similar to the guide and recess assembly described and shown in FIG. 4A, which will preclude movement of the inner pipe 814 in a second direction, opposite the first direction, with respect to the outer pipe 812.

Figure 9:
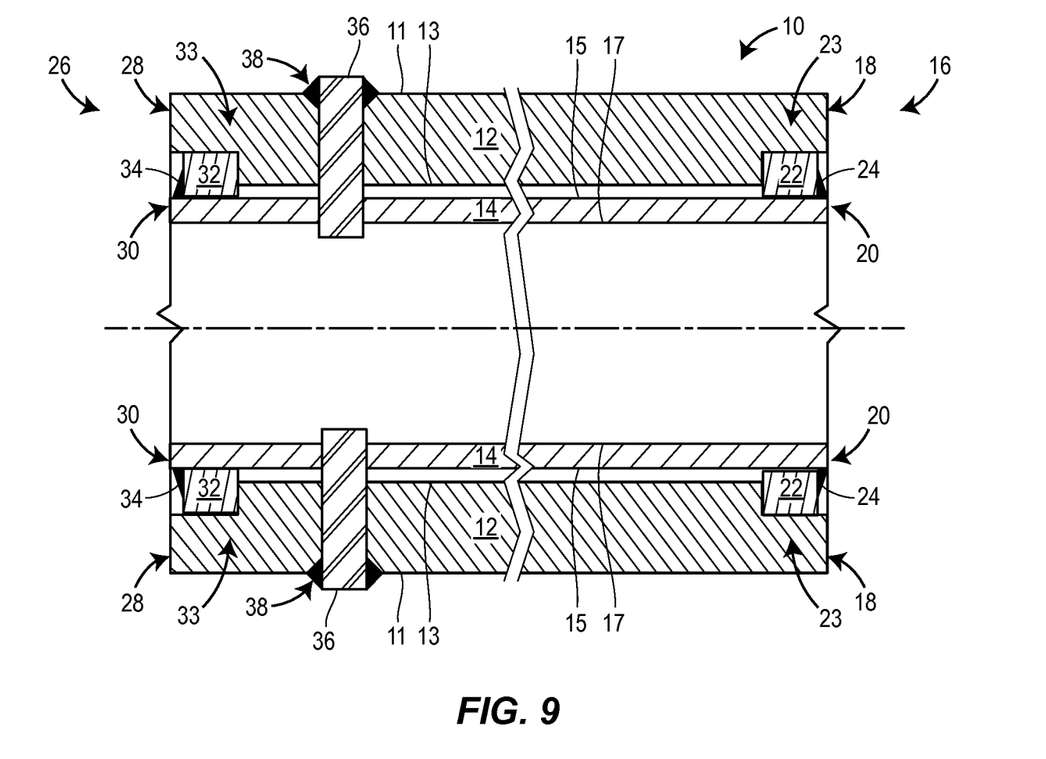
FIG. 9 is a partial cross-sectional schematic representation of a side view of another example pipe assembly including an alignment pin constructed in accordance with the principles of the present disclosure to secure the positioning of the inner pipe within the outer pipe.

Another mechanism from precluding movement of the inner pipe with respect to the outer pipe is shown in the pipe assembly 10 illustrated in FIG. 9. A pin 36 may be inserted through the outer pipe 12 to engage or pass through the inner pipe 14 to retain the inner pipe 14 from moving axially with respect to the outer pipe 12. The pin 36 is fixedly attached to the outer pipe 12 and projects through the exterior surface 11 and the interior surface 13 of the outer pipe 12 and into the exterior surface 15, or through both the exterior 15 and interior 17 surfaces, of the inner pipe 14. In one example embodiment, the pin 36 is fixedly attached by a weld 38 to the outer pipe 12, but other types of fixed attachment may be employed, for example, press-fit, bolts, and the like. Also, one or more pins 36 may be used to prevent axial movement of the inner pipe 14 with respect to the outer pipe 12. If more than one pin 36 is used, the pins may be located opposite each other or equidistant about the outer pipe exterior surface. The pin(s) 36 may be used in addition to one or more guide and recess assemblies to ensure that the position of the inner pipe 14 with respect to the outer pipe 12 is retained.

Figure 10:
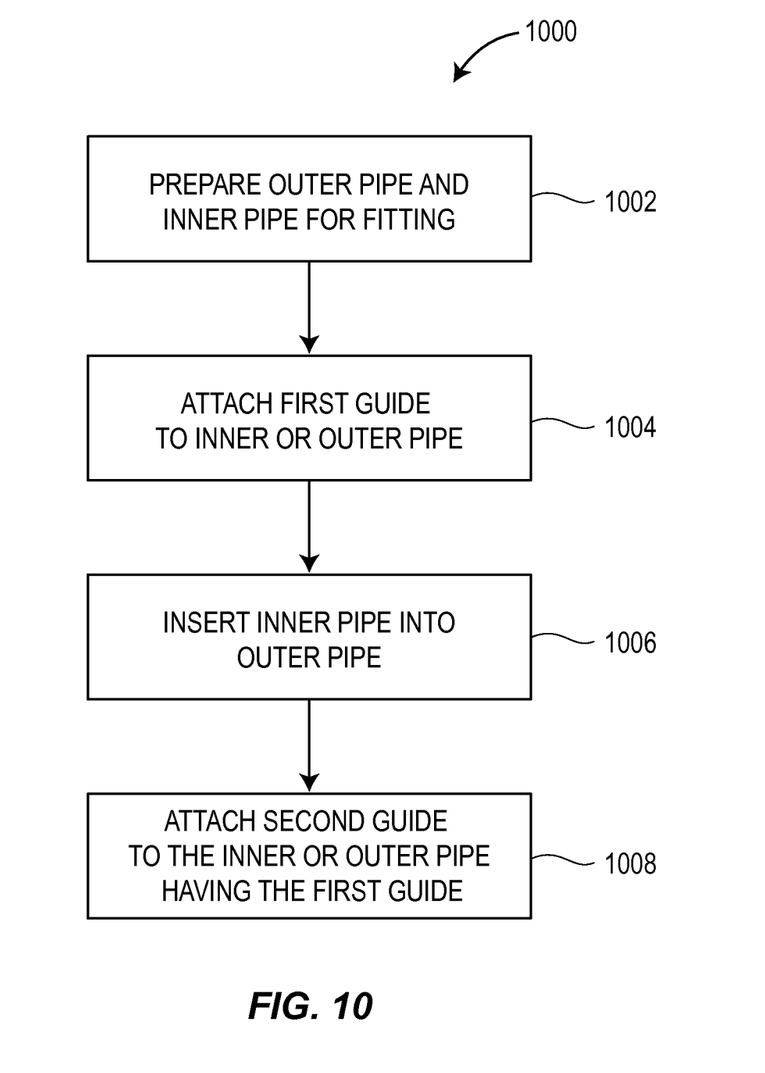
FIG. 10 is a flow diagram of an example method for assembling the pipe assembly in accordance with one embodiment of the present disclosure described herein.

A flow diagram 1000 of an example method for assembling one or more embodiments of the pipe assembly described above is shown in FIG. 10. The method may be performed manually and/or auto-mechanically and may also be integrated with a module stored in a memory device of a process system and executed by a computing device having a processor. The outer (boundary) pipe and/or the inner (liner) pipe are prepared for coupling wherein one or both pipes may be machined to receive at least a portion of the cooperating guide and recess assembly (block 1002). The recess may be machined into the end of one pipe and the corresponding end of the other pipe may be machined to receive the guide or create the guide. Only a portion of the inner and/or outer pipe(s) proximate the end(s) of the pipe assembly may need to be machined. The guide may be machined or fixedly attached to the inner or outer pipe (block 1004). The inner pipe is inserted into the outer pipe (block 1006), which may occur before or after the recess and the guide have been created and/or the guide has been fixedly attached. In pipe assemblies that utilize a second guide and recess assembly, the second guide can be fixedly attached to the pipe assembly proximate the opposite end of the pipe assembly (block 1008). In pipe assemblies incorporating two guide and recess assemblies, one assembly proximate each end of the pipe assembly, both guides may be attached to the same pipe or one of the guides may be integral with one of the pipes and the other guide may be attached to the same pipe.

It is apparent from the description above that a pipe assembly implementing the cooperating guide and recess assembly described herein may realize improved retention capabilities for retaining the position of the inner pipe within the outer pipe.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Additionally, certain embodiments are described herein as including logic or a number of routines, subroutines, applications, or instructions. These may constitute either software (e.g., code embodied on a machine-readable medium) or hardware. In hardware, the routines, etc., are tangible units capable of performing certain operations and may be configured or arranged in a certain manner. In example embodiments, one or more computer systems (e.g., a standalone client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory product to which it is communicatively coupled. A further hardware module may then, at a later time, access the memory product to retrieve and process the stored output. Hardware modules may also initiate communications with input or output products, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods or routines described herein may be at least partially processor-implemented. For example, at least some of the operations of a method may be performed by one or more processors or processor-implemented hardware modules. The performance of particular operations may be distributed among the one or more processors, not only residing within a single machine, but deployed across a number of machines. In some example embodiments, the processor or processors may be located in a single location (e.g., within a home environment, an office environment, a mobile platform, or as a server farm), while in other embodiments the processors may be distributed across a number of locations.

The performance of particular operations may be distributed among the one or more processors, not only residing within a single machine, but deployed across a number of machines. In some example embodiments, the one or more processors or processor-implemented modules may be located in a single geographic location (e.g., within a home environment, an office environment, a mobile platform, or a server farm). In other example embodiments, the one or more processors or processor-implemented modules may be distributed across a number of geographic locations.

Unless specifically stated otherwise, discussions herein using words such as "processing," "computing," "calculating," "determining," "presenting," "displaying," "identifying," "predicting," "analyzing," and the like may refer to actions or processes of a machine (e.g., a computing device) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the description. This description, and the claims that follow, should be read to include one or at least one and the singular also includes the plural unless it is obvious that it is meant otherwise.

Still further, for the purposes of illustration only, the figures depict preferred embodiments of a communication system and method for a mobile platform. One skilled in the art will readily recognize from the discussion above that alternative embodiments of the structures and methods illustrated herein may be employed without departing from the principles described herein.

Of course, the applications and benefits of the systems, methods, and techniques described herein are not limited to only the above examples. Many other applications and benefits are possible by using the systems, methods, and techniques described herein.

It should also be understood that, unless a term is expressly defined in this patent using the sentence "As used herein, the term '________' is hereby defined to mean . . . " or a similar sentence, there is no intent to limit the meaning of that term, either expressly or by implication, beyond its plain or ordinary meaning, and such term should not be interpreted to be limited in scope based on any statement made in any section of this patent (other than the language of the claims). To the extent that any term recited in the claims at the end of this patent is referred to in this patent in a manner consistent with a single meaning, that is done for sake of clarity only so as to not confuse the reader, and it is not intended that such claim term be limited, by implication or otherwise, to that single meaning. Finally, unless a claim element is defined by reciting the word "means" and a function without the recital of any structure, it is not intended that the scope of any claim element be interpreted based on the application of 35 U.S.C. § 112(f) and/or pre-AIA 35 U.S.C. § 112, sixth paragraph.

Moreover, although the foregoing text sets forth a detailed description of numerous different embodiments, it should be understood that the scope of the patent is defined by the words of the claims set forth at the end of this patent. The detailed description is to be construed as exemplary only and does not describe every possible embodiment because describing every possible embodiment would be impractical, if not impossible. Numerous alternative embodiments could be implemented, using either current technology or technology developed after the filing date of this patent, which would still fall within the scope of the claims. By way of example, and not limitation, the disclosure herein contemplates at least the following aspects:

Aspect 1: A pipe assembly having a first end and a second end, the pipe assembly comprising: an outer pipe including an outer pipe interior surface and an outer pipe exterior surface, wherein the outer pipe interior surface extends between a first end and a second end of the outer pipe and includes an outer pipe interior diameter, and the outer pipe exterior surface extends between the first end and the second end of the outer pipe and includes an outer pipe exterior diameter; an inner pipe positioned within the outer pipe, the inner piper including an inner pipe interior surface and an inner pipe exterior surface, wherein the inner pipe interior surface extends between a first end and a second end of the inner pipe and includes an inner pipe interior diameter, and the inner pipe exterior surface extends between the first end and the second end of the inner pipe and includes an inner pipe exterior diameter; a guide fixedly attached to the pipe assembly proximate the first end of the pipe assembly; and a recess defined within the pipe assembly proximate the first end of the pipe assembly and sized to receive at least a portion of the guide, wherein the guide cooperates with the recess to prevent movement of the inner pipe in a first direction with respect to the outer pipe.

Aspect 2: The pipe assembly of aspect 1, further comprising the guide fixedly attached to the inner pipe exterior surface and the recess includes a recess diameter extending from the outer pipe interior surface, the recess diameter larger than the outer pipe interior diameter.

Aspect 3: The pipe assembly of aspect 2, wherein the recess diameter includes a radial portion extending from the outer pipe interior surface and an axial portion extending from the radial portion.

Aspect 4: The pipe assembly of aspect 2, wherein the recess diameter includes a sloping portion extending from the outer pipe interior surface.

Aspect 5: The pipe assembly of any one of aspects 1-4, wherein the guide is a ring.

Aspect 6: The pipe assembly of any one of aspects 1-5, wherein the guide is welded to the inner pipe exterior surface.

Aspect 7: The pipe assembly of any one of aspects 1-6, further comprising a pin fixedly attached to the outer pipe exterior surface, wherein the pin projects through the outer pipe exterior surface, the outer pipe interior surface, and the inner pipe exterior surface.

Aspect 8: The pipe assembly of any one of aspects 1-7, further comprising the guide fixedly attached to the outer pipe interior surface and the recess includes a recess diameter extending from the inner pipe exterior surface, the recess diameter smaller than the inner pipe exterior diameter.

Aspect 9: The pipe assembly of any one of aspects 2-8, wherein the recess diameter includes a radial portion extending from the inner pipe exterior surface and an axial portion extending from the radial portion.

Aspect 10: The pipe assembly of any one of aspects 2-9, wherein the recess diameter includes a sloping portion extending from the inner pipe exterior surface.

Aspect 11: The pipe assembly of any one of aspects 1-10, wherein the guide is a first guide, and the recess is a first recess, the pipe assembly further comprising: a second guide fixedly attached to the pipe assembly proximate the second end of the pipe assembly; and a second recess defined within the pipe assembly proximate the second end of the pipe assembly and sized to receive at least a portion of the second guide, wherein the second guide cooperates with the second recess to prevent movement of the inner pipe in a second direction with respect to the outer pipe.

Aspect 12: The pipe assembly of aspect 11, further comprising the second guide fixedly attached to the inner pipe exterior surface and the second recess includes a second recess diameter extending from the outer pipe interior surface, the second recess diameter larger than the outer pipe interior diameter.

Aspect 13: The pipe assembly of any one of aspects 11-12, wherein the second recess includes a radial portion extending from the outer pipe interior surface and an axial portion extending from the radial portion.

Aspect 14: The pipe assembly of any one of aspects 12-13, wherein the second recess diameter includes a sloping portion extending from the outer pipe interior surface.

Aspect 15: The pipe assembly of any one of aspects 11-14, further comprising a pin fixedly attached to the outer pipe exterior surface, wherein the pin projects through the outer pipe exterior surface, the outer pipe interior surface, and the inner pipe exterior surface.

Aspect 16: The pipe assembly of any one of aspects 11-15, wherein the second guide is a ring.

Aspect 17: The pipe assembly of any one of aspects 11-16, wherein the second guide is welded to the inner pipe exterior surface.

Aspect 18: The pipe assembly of aspect 1-10, wherein the guide is a first guide, and the recess is a first recess, the pipe assembly further comprising: a second guide fixedly attached to the pipe assembly proximate the second end of the pipe assembly; and a second recess defined within the pipe assembly proximate the second end of the pipe assembly, wherein the second guide cooperates with the second recess to prevent movement of the inner pipe in a second direction with respect to the outer pipe.

Aspect 19: The pipe assembly of aspect 18, further comprising the second guide fixedly attached to the outer pipe interior surface and the second recess includes a second recess diameter extending from the inner pipe exterior surface, the second recess diameter smaller than the inner pipe exterior diameter.

Aspect 20: The pipe assembly of any one of aspects 18-19, wherein the second recess includes a radial portion extending from the inner pipe exterior surface and an axial portion extending from the radial portion.

Aspect 21: The pipe assembly of any one of aspects 19-20, wherein the second recess diameter includes a sloping portion extending from the inner pipe exterior surface.

Aspect 22: The pipe assembly of any one of aspects 18-21, further comprising a pin fixedly attached to the outer pipe exterior surface, wherein the pin projects through the outer pipe exterior surface, the outer pipe interior surface, and into the inner pipe exterior surface.

Aspect 23: The pipe assembly of any one of aspects 18-22, wherein the second guide is a ring Aspect 24: The pipe assembly of any one of aspects 18-23, wherein the second guide is welded to the outer pipe interior surface.

Aspect 25: A pipe assembly, comprising: an outer pipe including a first end and a second end; an inner pipe including a first end and a second end, the inner pipe positioned within the outer pipe; a guide fixedly attached to the pipe assembly proximate the first end of the outer pipe and the inner pipe; and a recess located proximate the first end of the outer pipe and the inner pipe and sized to receive at least a portion of the guide, wherein the guide and the recess cooperate to prevent movement of the inner pipe within the outer pipe in a first direction.

Aspect 26: The pipe assembly of aspect 25, wherein recess includes a radial portion extending from the outer pipe and an axial portion extending from the radial portion.

Aspect 27: The pipe assembly of any one of aspects 25-26, wherein the recess includes a sloping portion extending from the outer pipe.

Aspect 28: The pipe assembly of any one of aspects 25-27, wherein the guide is welded to the outer diameter of the inner pipe.

Aspect 29: The pipe assembly of any one of aspects 25-28, wherein the guide is a continuous ring.

Aspect 30: The pipe assembly of any one of aspects 25-29, wherein the guide is a first guide and the recess is a first recess, the pipe assembly further comprising: a second guide fixedly attached to the outer diameter of the inner pipe and sized to receive at least a portion of the second guide, wherein the second guide and the second recess cooperate to prevent movement of the inner pipe within the outer pipe in a second direction opposite to the first direction.

Aspect 31: The pipe assembly of any one of aspects 25-30, further comprising a pin fixedly attached to an outer diameter of the outer pipe, wherein the pin projects through the outer pipe exterior surface, the outer pipe interior surface, and the inner pipe exterior surface.

Aspect 32: A method for assembling a pipe, the method comprising: providing an inner pipe and an outer pipe; forming a recess within an inner diameter of the outer pipe; attaching a guide to an outer diameter of the inner pipe; inserting the inner pipe within the outer pipe, wherein the recess and guide cooperate to prevent the inner pipe from completely passing axially through the outer pipe.

Aspect 33. The method of aspect 32, wherein the guide is a first guide and the recess is a first recess, the method further comprising: forming a second recess within the inner diameter of the outer pipe; and attaching a second guide to the outer diameter of the inner pipe.

Aspect 34: A pipe assembly having a first end and a second end, the pipe assembly comprising: an outer pipe including an outer pipe interior surface and an outer pipe exterior surface, wherein the outer pipe interior surface extends between a first end and a second end of the outer pipe and includes an outer pipe interior diameter, and the outer pipe exterior surface extends between the first end and the second end of the outer pipe and includes an outer pipe exterior diameter; an inner pipe positioned within the outer pipe, the inner piper including an inner pipe interior surface and an inner pipe exterior surface, wherein the inner pipe interior surface extends between a first end and a second end of the inner pipe and includes an inner pipe interior diameter, and the inner pipe exterior surface extends between the first end and the second end of the inner pipe and includes an inner pipe exterior diameter; a guide integrally defined within the pipe assembly proximate the first end of the pipe assembly and extending from the inner or outer pipe; and a recess integrally defined within the pipe assembly proximate the first end of the pipe assembly and extending from the inner or outer pipe and sized to receive at least a portion of the guide, wherein the guide cooperates with the recess to prevent movement of the inner pipe in a first direction with respect to the outer pipe.

Although certain example methods, apparatuses, and articles of manufacture have been described herein, the scope of coverage of this patent is not limited thereto. On the contrary, this patent covers all methods, apparatuses, and articles of manufacture fairly falling within the scope of the appended claims either literally or under the doctrine of equivalents.

What is claimed is:

1. A pipe assembly including a first open end and a second open end for transporting a fluid therethrough, the pipe assembly comprising:
    an outer pipe including an outer pipe interior surface and an outer pipe exterior surface, wherein the outer pipe interior surface extends between a first end and a second end of the outer pipe and includes an outer pipe interior diameter, and the outer pipe exterior surface extends between the first end and the second end of the outer pipe and includes an outer pipe exterior diameter;
    an inner pipe including a first open end and a second open end, the inner pipe positioned within the outer pipe and forming a channel between the inner and outer pipes, the inner piper including an inner pipe interior surface and an inner pipe exterior surface, wherein the inner pipe interior surface extends between a first end and a second end of the inner pipe and includes an inner pipe interior diameter, and the inner pipe exterior surface extends between the first end and the second end of the inner pipe and includes an inner pipe exterior diameter;
    a guide welded to the exterior surface of the inner pipe proximate the first end of the outer pipe and the first open end of the inner pipe; and
    a recess defined within the interior surface of the outer pipe proximate the first end of the outer pipe, the recess including a recess diameter including a radial portion extending radially from the outer pipe interior surface and an axial portion extending axially from the radial portion, the recess diameter is larger than the outer pipe interior diameter and sized to receive at least a portion of the guide, wherein the guide abuts the recess to prevent movement of the inner pipe in a first direction with respect to the outer pipe, and wherein the guide and recess cooperate to preclude fluid from being transported within the channel.

2. The pipe assembly of claim 1, wherein the recess diameter includes a sloping portion extending from the outer pipe interior surface.

3. The pipe assembly of claim 1, wherein the guide is a ring.

4. The pipe assembly of claim 1, further comprising a pin fixedly attached to the outer pipe exterior surface, wherein the pin projects through the outer pipe exterior surface, the outer pipe interior surface, and the inner pipe exterior surface.

5. The pipe assembly of claim 1, further comprising a pin fixedly attached to the outer pipe exterior surface, wherein the pin projects through the outer pipe exterior surface, the outer pipe interior surface the inner pipe exterior surface, and the inner pipe interior surface.

6. The pipe assembly of claim 1, wherein the guide is a first guide, the recess is a first recess, and the recess diameter is a first recess diameter, the pipe assembly further comprising:
    a second guide fixedly attached to the exterior surface of the inner pipe proximate the second end of the pipe assembly; and
    a second recess defined within the interior surface of the outer pipe assembly proximate the second end of the pipe assembly and sized to receive at least a portion of the second guide, wherein the second guide abuts the second recess to prevent movement of the inner pipe in a second direction with respect to the outer pipe.

7. The pipe assembly of claim 6, further comprising the second guide fixedly attached to the inner pipe exterior surface and the second recess includes a second recess diameter extending from the outer pipe interior surface, the second recess diameter larger than the outer pipe interior diameter.

8. The pipe assembly of claim 7, wherein the second recess includes a radial portion extending from the outer pipe interior surface and an axial portion extending from the radial portion.

9. The pipe assembly of claim 7, wherein the second recess diameter includes a sloping portion extending from the outer pipe interior surface.

10. The pipe assembly of claim 7, wherein the second guide is a ring.

11. The pipe assembly of claim 7, wherein the second guide is welded to the inner pipe exterior surface.

12. The pipe assembly of claim 6, further comprising a pin fixedly attached to the outer pipe exterior surface, wherein the pin projects through the outer pipe exterior surface, the outer pipe interior surface, and the inner pipe exterior surface.

13. A pipe assembly including a first open end and a second open end for transporting a fluid therethrough, the pipe assembly comprising:
    an outer pipe including a first end and a second end;
    an inner pipe including a first open end and a second open end, the inner pipe positioned within the outer pipe and forming a channel therebetween;
    a guide welded to an exterior surface of the inner pipe proximate the first end of the outer pipe and the first open end of the inner pipe;
    a recess defined within an interior surface of the outer pipe and proximate the first end of the outer pipe, the recess including a recess diameter including a radial portion extending radially from the outer pipe interior surface and an axial portion extending axially from the radial portion, the recess diameter is larger than the outer pipe interior diameter and sized to receive at least a portion of the guide, wherein the guide abuts the recess to prevent movement of the inner pipe within the outer pipe in a first direction, and wherein the guide and recess cooperate to preclude fluid from being transported within the channel.

14. The pipe assembly of claim 13, wherein the guide is a first guide and the recess is a first recess, the pipe assembly further comprising:
- a second guide fixedly attached to the outer diameter of the inner pipe proximate the second end of the outer pipe and the inner pipe;
- a second recess defined within the interior surface of the outer pipe, the second recess located proximate the second open end of the outer pipe and the inner pipe and sized to receive at least a portion of the second guide, wherein the second guide abuts the second recess to prevent movement of the inner pipe within the outer pipe in a second direction opposite to the first direction.

15. The pipe assembly of claim 13, further comprising a pin fixedly attached to an outer diameter of the outer pipe, wherein the pin projects through the outer pipe exterior surface, the outer pipe interior surface, and the inner pipe exterior surface.

16. The pipe assembly of claim 13, wherein the guide is a continuous ring.

17. The pipe assembly of claim 13, wherein the recess includes a sloping portion extending from the outer pipe.

* * * * *

UNITED STATES PATENT AND TRADEMARK OFFICE
CERTIFICATE OF CORRECTION

| | |
|---|---|
| PATENT NO. | : 10,627,020 B2 |
| APPLICATION NO. | : 14/594521 |
| DATED | : April 21, 2020 |
| INVENTOR(S) | : Justin Paul Goodwin et al. |

Page 1 of 1

It is certified that error appears in the above-identified patent and that said Letters Patent is hereby corrected as shown below:

In the Specification

At Column 9, Line 21, "432" should be -- 432. --.

At Column 16, Line 12, "ring" should be -- ring. --.

At Column 16, Line 57, "33." should be -- 33: --.

Signed and Sealed this
Second Day of February, 2021

Drew Hirshfeld
*Performing the Functions and Duties of the*
*Under Secretary of Commerce for Intellectual Property and*
*Director of the United States Patent and Trademark Office*